United States Patent
Noda

(10) Patent No.: US 8,198,779 B2
(45) Date of Patent: Jun. 12, 2012

(54) STATOR OF ELECTRIC ROTATING MACHINE AND WINDING METHOD THEREOF

(75) Inventor: Tatsuya Noda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 364 days.

(21) Appl. No.: 12/556,903

(22) Filed: Sep. 10, 2009

(65) Prior Publication Data

US 2010/0066193 A1 Mar. 18, 2010

(30) Foreign Application Priority Data

Sep. 17, 2008 (JP) ................... 2008-237882

(51) Int. Cl.
*H02K 1/18* (2006.01)
(52) U.S. Cl. ............................................. 310/216.009
(58) Field of Classification Search ........... 310/216.004, 310/216.009, 216.011, 216.094, 216.095, 310/216.135
See application file for complete search history.

(56) References Cited

U.S. PATENT DOCUMENTS 6,369,687 B1 * 4/2002 Akita et al. ................... 336/234
7,067,952 B2 * 6/2006 Neal ........................... 310/254.1

FOREIGN PATENT DOCUMENTS

JP 2002-281697 9/2002

* cited by examiner

*Primary Examiner* — Dang Le
(74) *Attorney, Agent, or Firm* — Squire Sanders (US) LLP

(57) ABSTRACT

In a stator of an electric rotating machine such as a motor, there is provided with laminated 24 yoke pieces that form a yoke of circular shape when assembled and the yoke pieces are made rotatable relative to each other. Similarly laminated 24 teeth are each connected to each of the yoke pieces and a winding is wound on the teeth. In the stator, the teeth radially protrude inward in the yoke when the yoke pieces are assembled as the yoke such that some gap between adjacent teeth can be widened than others. Specifically, each of the yoke pieces has a first plate bored with a hole and a second plate formed with a projection and the plurality of the yoke pieces are rotatably connected through the holes and the projections to enable some gaps to be widened than others

5 Claims, 9 Drawing Sheets

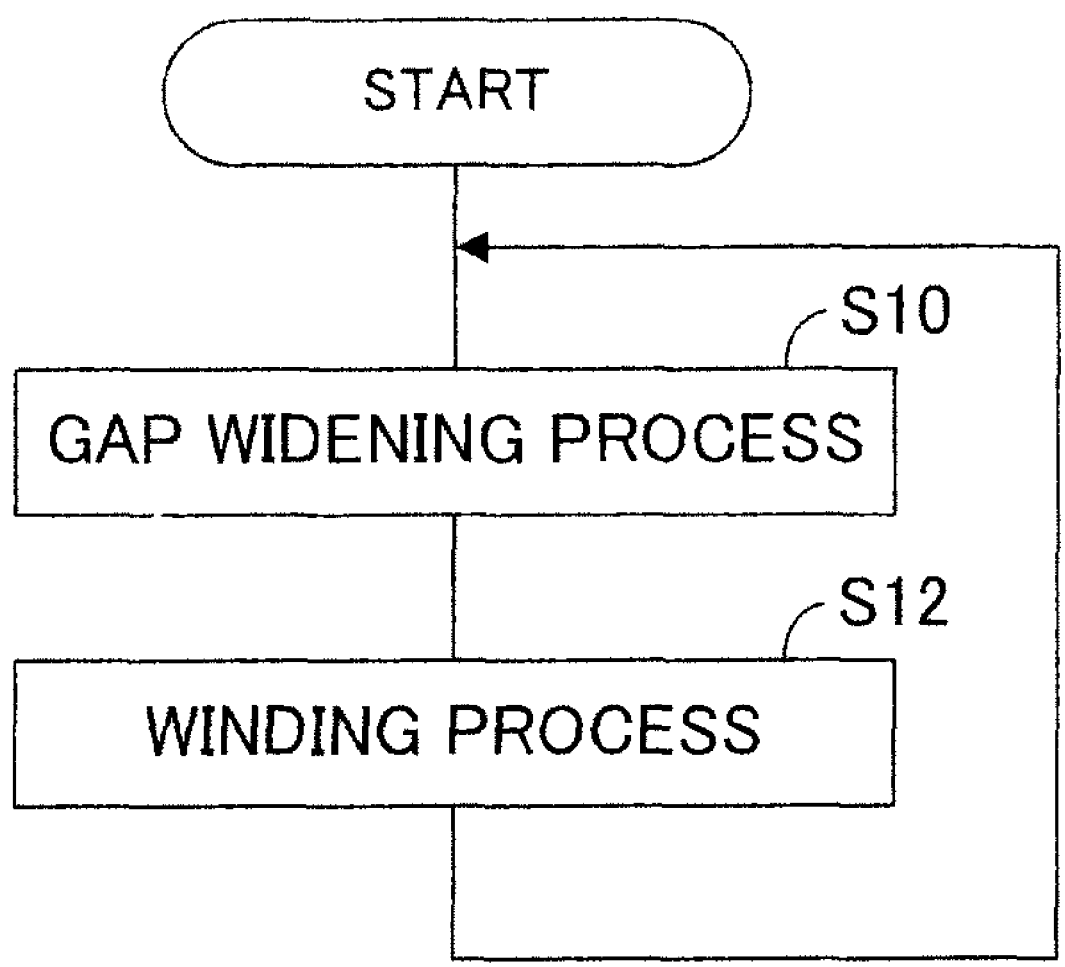

STATOR OF ELECTRIC ROTATING MACHINE AND WINDING METHOD THEREOF

BACKGROUND OF THE INVENTION

1. Field of the Invention

This invention relates to a stator of an electric rotating machine and a winding method thereof

2. Description of the Related Art

There is known a stator of an electric rotating machine in which multiple teeth formed to radially protrude inward in a circular yoke are wound with a winding. Since the multiple teeth of this type of stator radially protrude inward in the circular yoke, a gap between adjacent teeth is small and hence, it is difficult to wind the winding on the teeth with the yoke maintaining its circular shape. In a stator taught by Japanese Laid-open Patent Application No. 2002-281697 (FIG. 7, etc.), a circular yoke is constituted of a plurality of yoke pieces (divided yoke pieces) that can slide in the circumferential direction. Accordingly, when a winding is to be wound, the yoke pieces are slid in the circumferential direction to expand the diameter of the yoke for widening every gap between adjacent teeth.

Generally, a stator of an electric rotating machine is configured so that one wire is continuously wound on multiple teeth. Employing a method to wholly expand the circular yoke in diameter as in the reference, when the circular yoke is contracted and restored to the normal size after the winding of one wire has been wound on the circular yoke, it adversely causes a loose jumper potion in the winding.

SUMMARY OF THE INVENTION

An object of this invention is therefore to overcome the aforesaid problem by providing a stator of an electric rotating machine and a winding method thereof, the stator having a plurality of teeth that radially protrude inward in a circular yoke and are wound with a winding, in which a winding can be easily wound without causing a jumper portion to loose.

In order to achieve the object, the present invention provides in its first aspect a stator of an electric rotating machine, comprising: a plurality of laminated yoke pieces that form a yoke of circular shape when assembled, the yoke pieces being made rotatable relative to each other; a plurality of laminated teeth each connected to each of the yoke pieces, and a winding to be wound on the teeth; wherein the teeth radially protrude inward in the yoke when the yoke pieces are assembled as the yoke such that a gap between adjacent teeth can be widened than others.

In order to achieve the object, the present invention provides in its second aspect a method of winding of a stator of an electric rotating machine having a yoke of circular shape and a plurality of teeth that are formed to radially protrude inward in the yoke and wound with a winding, comprising the steps of: gap widening process that deforms the yoke to noncircular shape to widen a gap between adjacent teeth compared to others; and winding process that insert the winding through the widened gap and wind the winding on the teeth.

BRIEF DESCRIPTION OF THE DRAWINGS

The above and other objects and advantages of the invention will be more apparent from the following description and drawings in which:

FIG. 6 is a flowchart showing a winding method of the stator shown in FIG. 2;

DETAILED DESCRIPTION OF THE PREFERRED EMBODIMENTS

A stator of an electric rotating machine and a winding method thereof according to preferred embodiments of this invention will now be explained with reference to the drawings.

Figure 1:
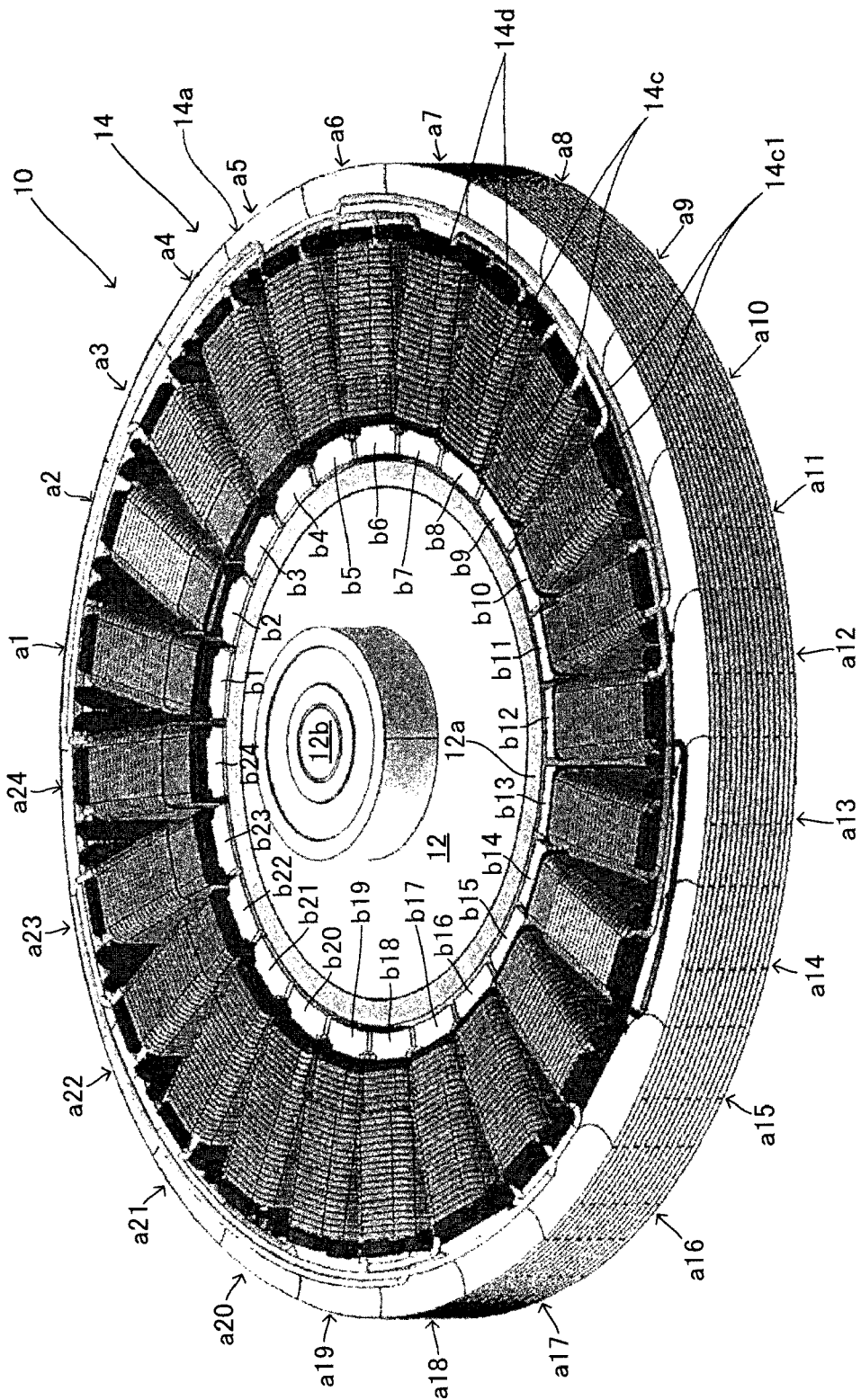
FIG. 1 is a perspective view showing a stator of an electric rotating machine, precisely an electric motor, according to a first embodiment of this invention.

FIG. 1 is a perspective view showing a stator of an electric rotating machine, precisely an electric motor, according to a first embodiment of this invention. A term "electric rotating machine" in the embodiments collectively indicates an electric motor or generator or synchronous converter. An electric motor is taken as an example in the following.

Reference numeral 10 designates the electric motor in FIG. 1. The motor 10 is constituted of a three-phase, i.e., U-, V- and W-phase brushless motor having a rotor 12 and a stator 14 installed around the rotor 12. Pieces of permanent magnet 12*a* are installed on the outer circumference of the rotor 12. The rotor 12 is rotated about a shaft 12*b* by magnetic induction.

The stator 14 comprises a circular yoke 14*a*, twenty-four teeth 14*b*1 to 14*b*24 (indicated as "b1," "b2," . . . "b24" in the drawing for short; when they are collectively or separately called, referred to as "teeth (tooth) 14*b*n") formed to radially protrude inward and a winding 14*c* wound thereon. The winding 14*c* comprises one wire for each phase.

The yoke 14*a* includes twenty-four yoke pieces 14*a*1 to 14*a*24 (indicated as "a1," "a2," . . . "a24" in the drawing for short; when they are collectively or separately called, referred to as "yoke piece(s) 14*a*n"). The yoke pieces 14*a*n are formed with the teeth 14*b*n one by one. The yoke pieces 14*a*n form the yoke 14*a* of a circular shape when assembled.

The winding 14*c* is wound on or around the teeth 14*a*n through insulators 14*d*. Also, the winding 14*c* is wound for each of the U-, V- and W-phases and wound on a plurality of teeth 14*b*n continuously. Therefore, jumper portions 14*c*1 for connecting several teeth are disposed along the yoke 14*a*.

Figure 2:
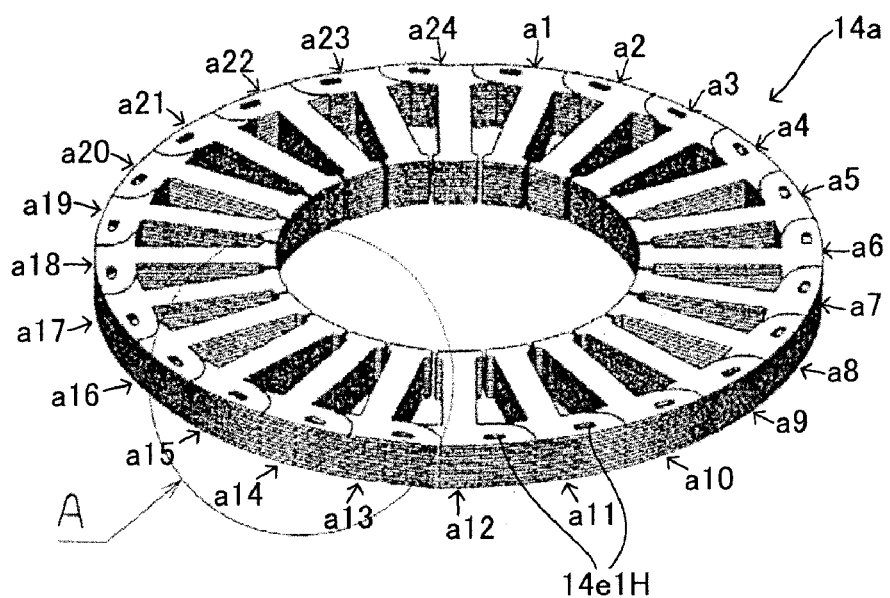
FIG. 2 is a perspective view of the stator shown in FIG. 1 before a winding is wound.
Figure 3:
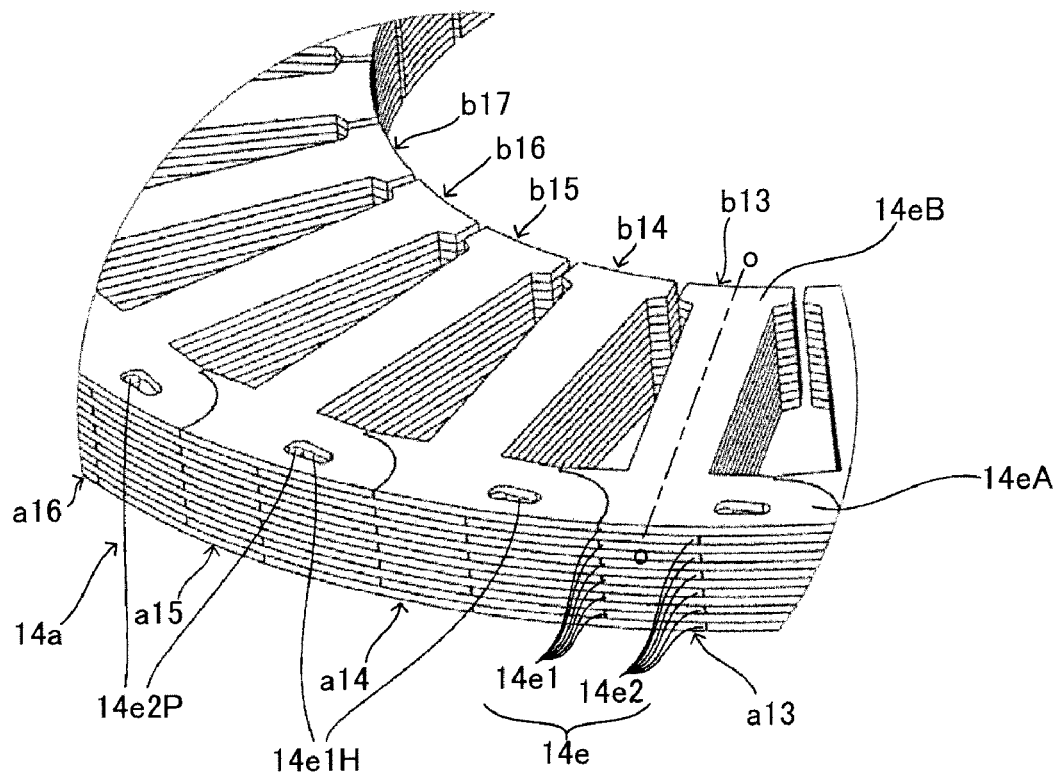
FIG. 3 is an enlarged view of region A of FIG. 2.

FIG. 2 is a perspective view of the stator 14 before the winding 14*c* is wound and FIG. 3 is an enlarged view of region A of FIG. 2.

Each of the yoke pieces 14*a*n and the teeth 14*b*n formed therewith are composed of twelve metal plates 14*e*. Each plate 14*e* has a yoke portion 14*e*A and tooth portion 14*e*B.

The twelve plates 14e are laminated and connected through the caulking in the laminated (thickness) direction, thereby integrally forming each of the yoke pieces 14an and the teeth 14bn.

Figure 4:
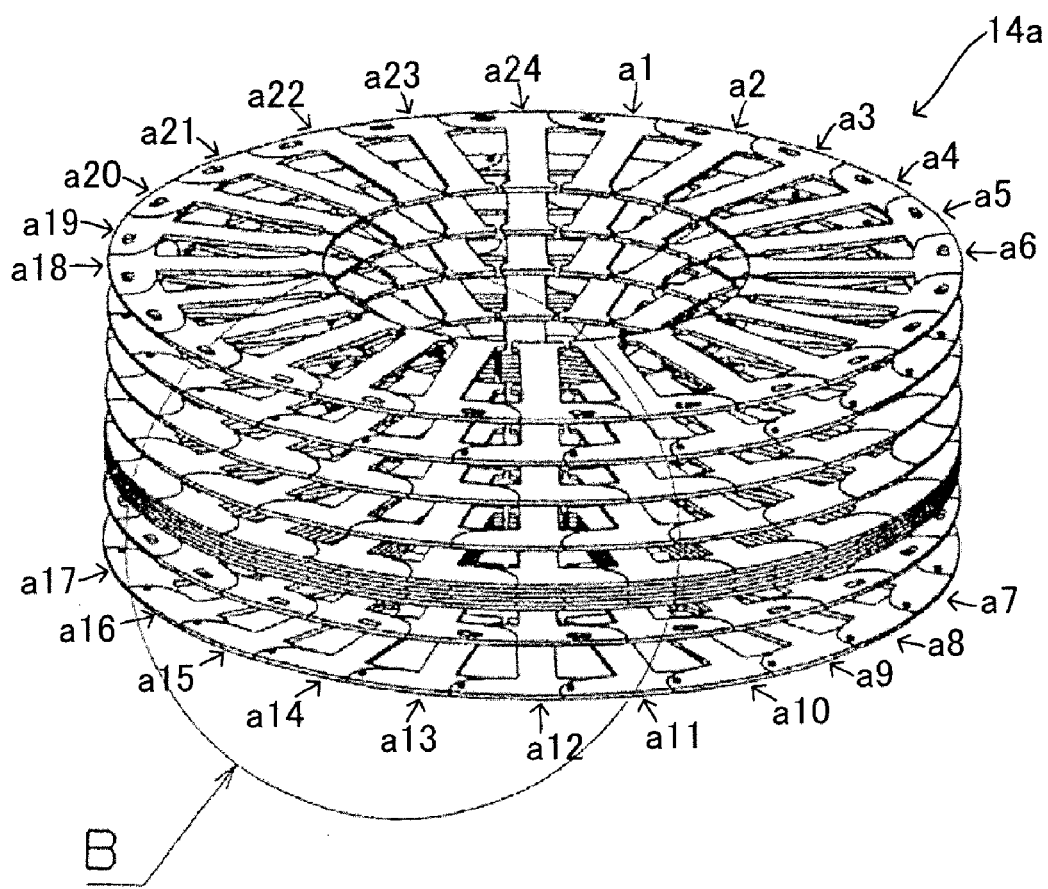
FIG. 4 is a perspective view showing the stator shown in FIG. 2 partially away from each other in the laminated direction.
Figure 5:
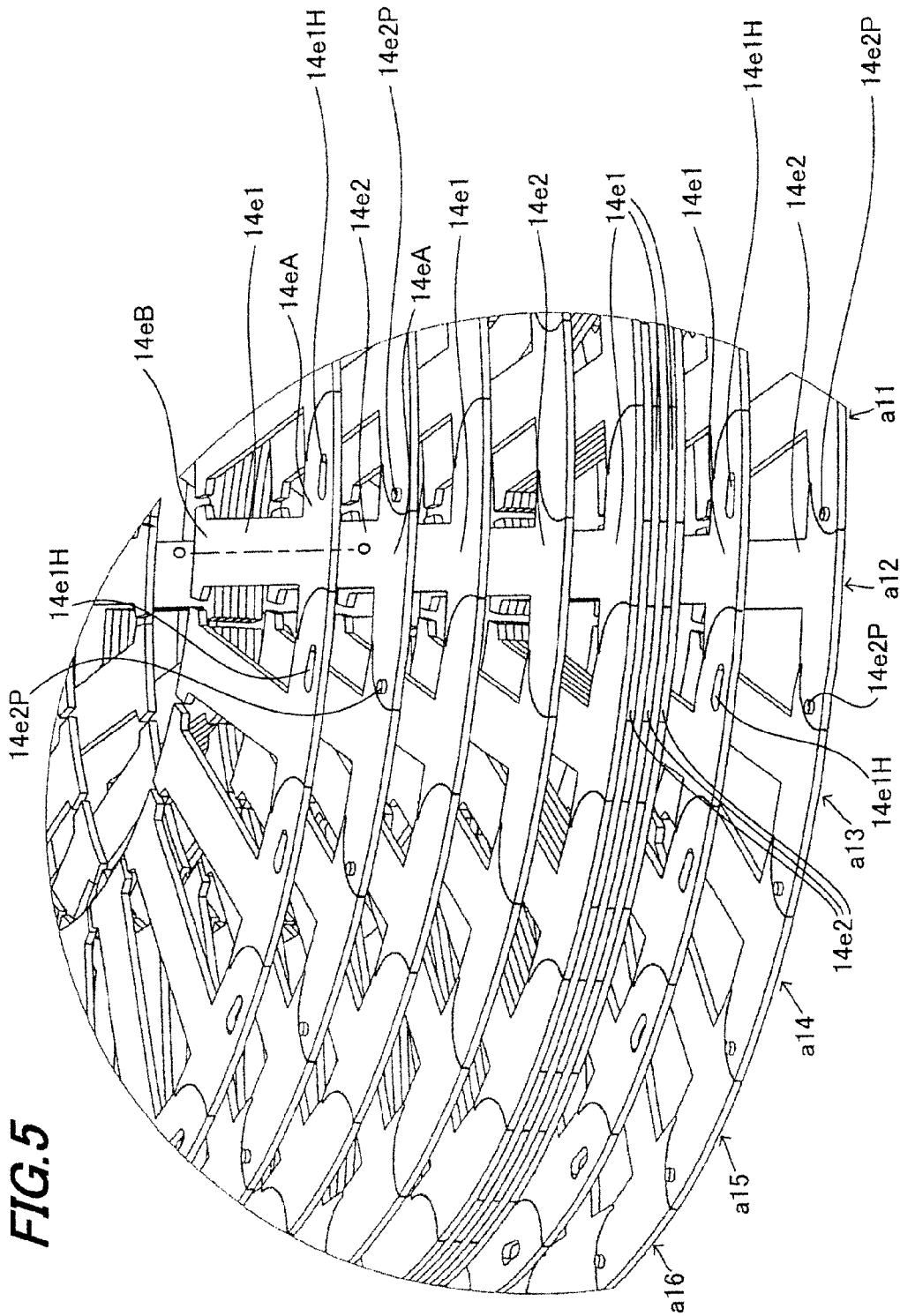
FIG. 5 is an enlarged view of region B of FIG. 4.

FIG. 4 is a perspective view showing the stator 14 partially away from each other in the laminated direction and FIG. 5 is an enlarged view of region B of FIG. 4.

Specifically, as shown in FIG. 5, each of the yoke pieces 14an and the teeth 14bn formed therewith are composed of a first group of six plates 14e1 and a second groups of six plates 14e2. In each of the yoke pieces 14an, the yoke portion 14eA of the first group plates 14e1 has an asymmetric shape relative to the center line o-o of the tooth portion 14eB. One end of the yoke portion 14eA has a convex shape and the other end thereof has a concave shape complementary to the convex.

Although the yoke portion 14eA of the second group plates 14e2 similarly has an asymmetric shape relative to the center line o-o of the tooth portion 14eB, they are the reversed shape of the first group plates 14e1. The first group plates 14e1 and second group plates 14e2 are alternately laminated and connected through the caulking to integrally form each yoke piece 14an and tooth 14bn.

Among the twelve plates 14e to be laminated, the yoke portion 14eA of the outermost one of the first group plates 14e1, specifically the outermost one at the front surface or the next to the outermost one at the back surface is bored with a non-round, e.g., an elliptical hole (through-hole) 14e1H that extends longer in the circumference direction of the yoke 14a than in the radial direction thereof. The yoke portion 14eA of the outermost one of the second group plates 14e2, specifically the next to the outermost one at the front surface or the outermost one at the back surface is formed with a projection 14e2P.

The hole 14e1H of the first group plates of one yoke piece (e.g., 14a12) is engaged with the projection 14e2P of the second group plates of the adjacent yoke piece (e.g., 14a11). The projection 14e2P of the second group plates of the one yoke piece (e.g., 14a12) is engaged with the hole 14e1H of the first group plates of the adjacent yoke piece in the opposite direction (e.g., 14a13).

Thus the adjacent yoke pieces are continuously connected each other through the holes 14e1H and projections 14e2P to form the yoke 14a, and a region where the two adjacent yoke portions 14eA are brought into contact therewith has a concave/convex shape of a quarter of a circle.

Accordingly, since two adjacent yoke pieces are connected through the hole 14e1H and projection 14e2P and the contacting region has a concave/convex shape of a quarter of a circle, the adjacent yoke pieces are configured to be able to rotate about the projection 14e2P relative to each other. The projection 14e2P is configured to slide in the hole 14e1H such that a distance between the adjacent yoke pieces can be changed.

Specifically, the yoke pieces 14an are connected to be able to displace relative to each other in a circumferential direction of the yoke 14a. Since the teeth 14bn are formed at each of the yoke pieces 14an, a gap between two adjacent teeth are made changeable with displacement of the corresponding yoke pieces 14an.

A winding method of the stator 14 will be explained.

FIG. 6 is a flowchart showing the winding method of the stator 14. The method comprises a repetition of gap widening process (S10) and winding process (S12).

FIG. 7 is an explanatory view showing the gap widening process of S10.

Figure 7A:
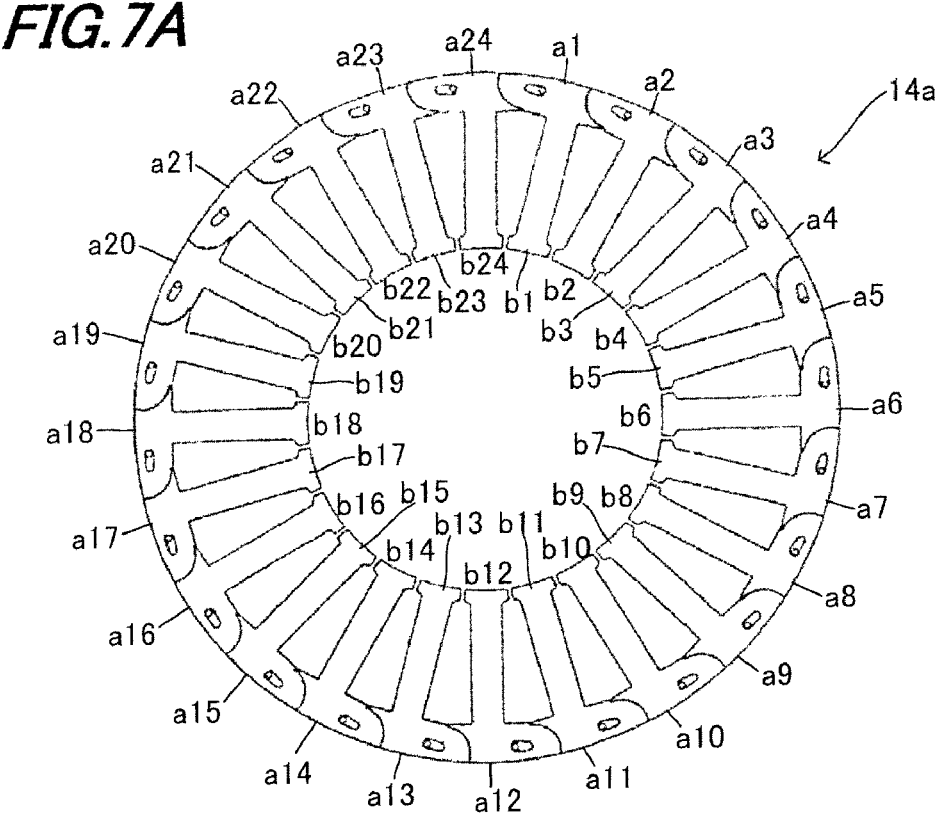
FIG. 7 is an explanatory view showing gap widening process shown in FIG. 6.
Figure 7B:
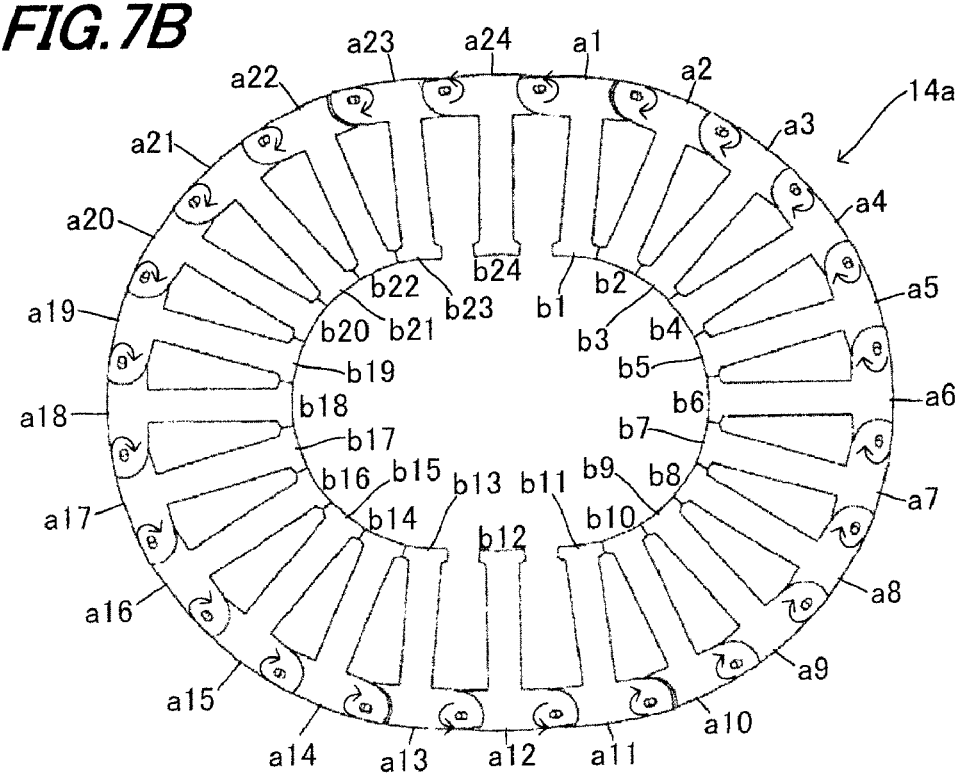

As shown in FIG. 7A, due to the structure of the stator 14 having the circular yoke 14a and the teeth 14bn radially protruding inward, the gaps between adjacent teeth are very small and hence, it is quite difficult to wind the winding 14c on (around) the teeth 14bn. Therefore, in the gap widening process of S10, an external force is applied to the yoke 14a in the radial direction to deform the yoke 14a to elliptical shape when viewed from the top as shown in FIG. 7B. With this, several among gaps formed between adjacent teeth, e.g., four gaps are widened.

Specifically, when an external force is applied to the vicinity of yoke pieces 14a24 and 14a12 in the radial direction, the yoke piece 14a2 is rotated clockwise relative to the yoke piece 14a1 as shown in FIG. 7B. At the same time, the yoke piece 14a3 is rotated clockwise relative to the yoke piece 14a2 and similarly the yoke pieces up to the one 14a11 are successively rotated clockwise relative to the yoke pieces adjacent thereto.

In contrast, the yoke piece 14a12 is rotated counterclockwise relative to the yoke piece 14a11 and similarly the yoke piece 14a13 is rotated counterclockwise relative to the yoke piece 14a12. But, the yoke piece 14a14 is rotated clockwise relative to the yoke piece 14a13 and the yoke piece 14a15 is also rotated clockwise relative to the yoke piece 14a14. Similarly, the yoke pieces up to the one 14a23 are successively rotated clockwise relative to the yoke pieces adjacent thereto.

And the yoke piece 14a24 is rotated counterclockwise relative to the yoke piece 14a23 and the yoke piece 14a1 is also rotated counterclockwise relative to the yoke piece 14a24.

As a result, although the gaps between the adjacent teeth formed with the yoke pieces 14a1 to 14a11 and 14a13 to 14a23 are closed except for those between the yoke pieces 14a24, 14a12, the gaps between the tooth 14b24 or 14b12 formed with the yoke piece 14a24 or 14a12 and the teeth adjacent thereto (14b23 and 14b1 or 14b11 and 14b13) are widened.

In addition, in each pair of the yoke pieces 14a1 and 14a2, 14a10 and 14a11, 14a13 and 14a14, and 14a22 and 14a23, the projection 14e2P is slid in the hole 14e1H so as to displace the yoke pieces in a direction away from each other. Therefore, the gaps between the tooth 14b24 or 14b12 formed with the yoke piece 14a24 or 14a12 and the teeth adjacent thereto (14b23 and 14b1 or 14b11 and 14b13) can be further widened.

Figure 8:
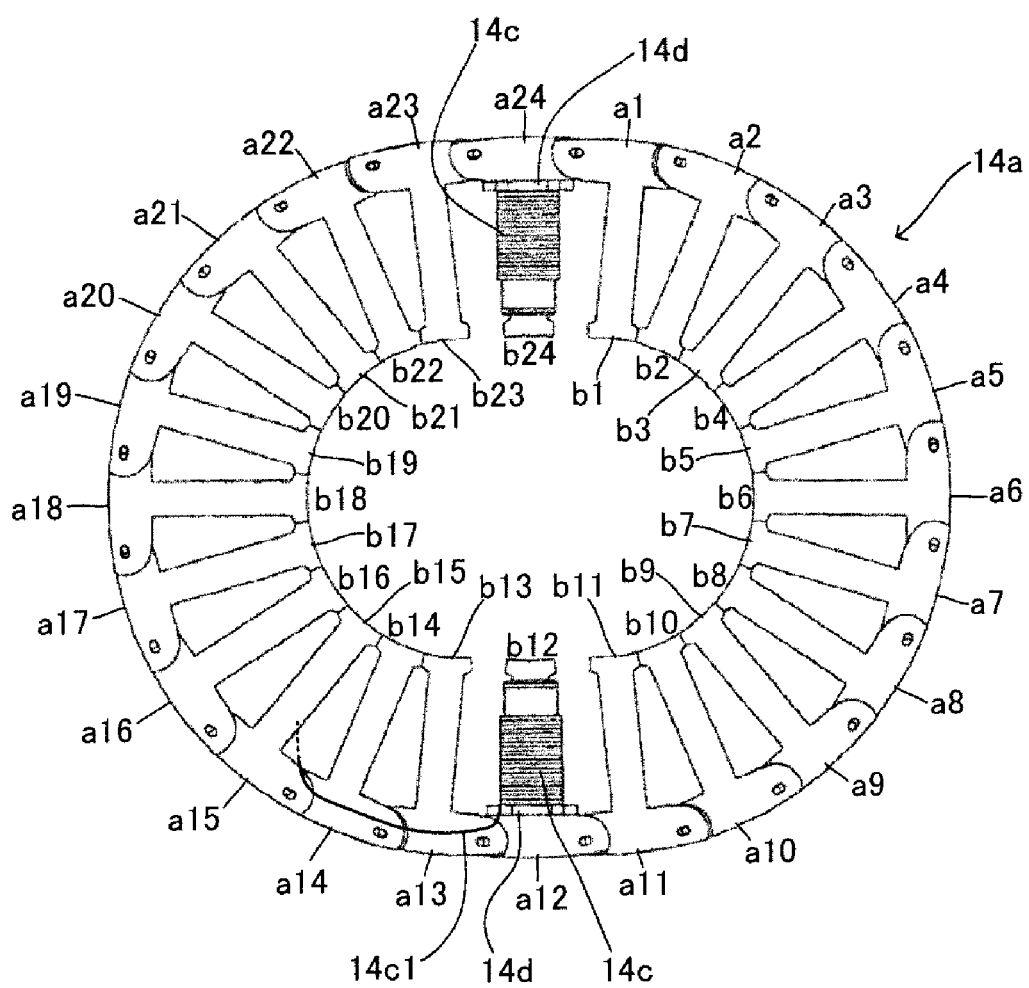
FIG. 8 is an explanatory view showing winding process shown in FIG. 6.

FIG. 8 is an explanatory view showing the winding process of S12.

In the winding process of S12, as shown in the drawing, the winding 14c comprising one wire for each phase is inserted through the widened gaps and is wound on and around the two teeth 14b24 and 14b12.

Next, returning to the gap widening process of S10, in order to wind the winding 14c on next two teeth (e.g., 14b3, 14b15) other than the teeth which are already wound with the winding 14c, an external force is applied to the vicinity of next yoke pieces (e.g., 14a3, 14a15) to deform the yoke 14a to elliptical shape so as to widen some, i.e., four gaps.

Then in the winding process of S12, the winding 14c is inserted through the widened gaps and is wound on and around the next two teeth (e.g., 14b3 and 14b15).

At this time, the winding 14c of the tooth 14b24 or 14b12 previously wound is jumped to a next tooth (e.g., 14b3 or 14b15) to be wound next to connect them. A jumper portion 14c1 of the winding 14c is placed partially along the yoke 14a.

In the subsequent, the process of S10 and S12 is repeated to wind the winding 14c on all of the teeth 14n.

It should be noted that, correctly speaking, the winding 14c is, in fact, wound on and around an insulator 14d that covers each teeth 14bn.

Thus, the stator 14 of the first embodiment is configured to have a plurality of laminated yoke pieces 14an that form a yoke 14a of circular shape when assembled, the yoke pieces being made rotatable relative to each other, a plurality of laminated teeth 14bn each connected to each of the yoke pieces 14an, and a winding 14c to be wound on the teeth, wherein the teeth 14bn radially protrude inward in the yoke 14a when the yoke pieces 14an are assembled as the yoke 14a such that a gap between adjacent teeth 14bn can be widened than others, i.e., some gaps between adjacent teeth 14bn can be widened than other gaps.

With this, by widening a gap(s) of tooth on which the winding 14c is to be wound and by inserting the winding 14c through the gap(s), it becomes possible to easily wind the winding 14c on the teeth 14bn.

In addition, each of the yoke pieces 14an has a first plate e1 bored with an elliptical hole 14e1H and a second plate e2 formed with a projection 14e2P and the plurality of the yoke pieces 14an are rotatably connected through the elliptical hole 14e1H and the projection 14e2P, and are displaceably connected by sliding the projection 14e2P in the elliptical hole 14e1H.

With this, since the displaced distance is limited within a distance corresponding to the length of the elliptical hole 14e1H, the increase in length of the yoke 14a in the circumferential direction is restricted and small, it becomes possible to prevent the jumper portion 14c1 from loosening even when the one winding 14c is wound around a plurality of teeth 14bn continuously.

Further, since the hole 14e1H and projection 14e2P is provided only to the outermost first plate 14e1 or outermost second plate 14e2, in other words, one of the first plate e1 and the second plate e2 is installed outermost in a laminated direction of each of the yoke pieces 14an, the decrease in magnetic paths in the yoke 14a can be suppressed to the minimum.

Further, the method of winding of a stator of an electric rotating machine according to the embodiment is configured such, the circular yoke 14a is deformed to elliptical shape so that several gaps from among gaps formed between adjacent teeth of the twenty-four teeth 14bn are widened compared to the other gaps and the winding 14c is wound around the teeth through the widened gaps, in other words, due to deformation of the yoke 14a to elliptical shape, only gaps between teeth to be wound with the winding 14c and teeth adjacent thereto are widened and the winding 14c is wound therethrough.

With this, it becomes possible to easily wind the winding 14c around the teeth 14bn and prevent the jumper portion 14c1 from loosening even when the one winding 14c is wound around a plurality of teeth continuously.

Next, a winding method of the stator of the electric rotating machine according to a second embodiment will be explained.

The stator 14 is the same as in the first embodiment and the winding method thereof is merely different from the first embodiment.

The explanation will be made with focus on points of difference from the first embodiment. In the second embodiment, a shape of the yoke 14a after deformation implemented for winding the winding 14c is different.

Figure 9A:
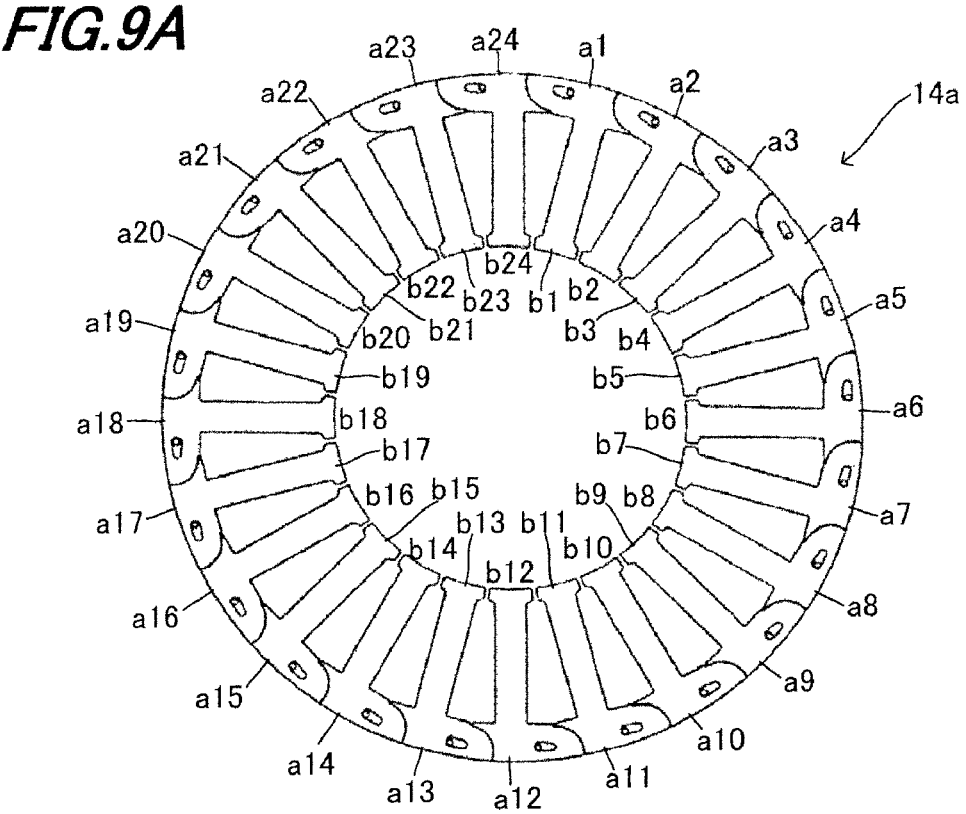
FIG. 9 is an explanatory view similar to FIG. 7, but showing gap widening process in a winding method of a stator of an electric rotating machine according to a second embodiment of this invention.

FIG. 9 is an explanatory view similar to FIG. 7, but showing gap widening process in the winding method according to the second embodiment.

Figure 9B:
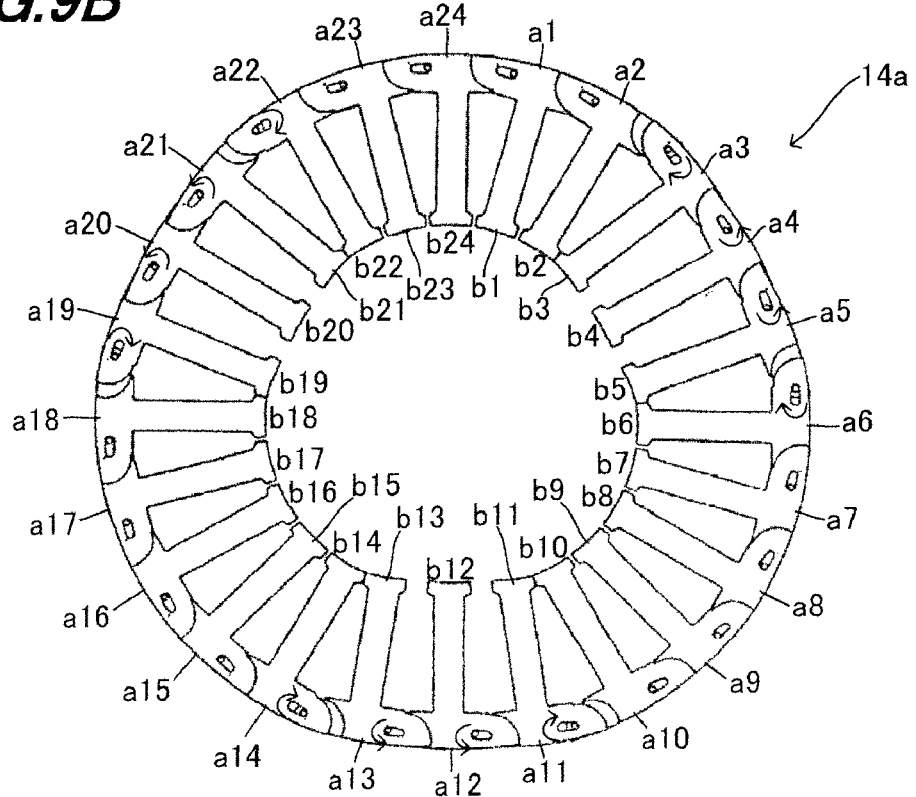

As shown in FIG. 9B, external forces are applied to the yoke 14a in the radial direction from three points to deform the yoke 14a to substantially triangular shape. The three points are determined by dividing 360 degrees equally by 3, so that the yoke 14a is deformed to substantially equilateral triangular shape (which does not have clear vertices and sides). As a result, six (i.e., three pairs of) gaps between adjacent teeth are widened.

Specifically, when external forces are applied to the vicinity of three yoke pieces 14a4, 14a12 and 14a20 in the radial direction, the yoke piece 14a3 is rotated clockwise relative to the yoke piece 14a2. In contrast, the yoke piece 14a4 is rotated counterclockwise relative to the yoke piece 14a3 and the yoke piece 14a5 is also rotated counterclockwise relative to the yoke piece 14a4. The yoke piece 14a6 is rotated clockwise relative to the yoke piece 14a5 and the yoke piece 14a11 is also rotated clockwise relative to the yoke piece 14a10.

In contrast, the yoke piece 14a12 is rotated counterclockwise relative to the yoke piece 14a11 and the yoke piece 14a13 is also rotated counterclockwise relative to the yoke piece 14a12. The yoke piece 14a14 is rotated clockwise relative to the yoke piece 14a13. Similarly the yoke piece 14a19 is rotated clockwise relative to the yoke piece 14a18.

The yoke piece 14a20 is rotated counterclockwise relative to the yoke piece 14a19 and the yoke piece 14a21 is also rotated counterclockwise relative to the yoke piece 14a20. The yoke piece 14a22 is rotated clockwise relative to the yoke piece 14a21.

As a result, although gaps between the adjacent teeth formed with the yoke pieces 14a2 and 14a3, 14a5 and 14a6, 14a10 and 14a11, 14a13 and 14a14, 14a18 and 14a19, and 14a21 and 14a22 disappear, gaps between the tooth 14b4, 14b12 or 14b20 formed with the yoke piece 14a4, 14a12 or 14a20 and the teeth adjacent thereto (14b3 and 14b5, 14b11 and 14b13 or 14b19 and 14b21) are widened. It should be noted that a yoke piece (e.g., 14a2) other than the above may be rotated clockwise relative to the adjacent yoke piece (e.g., 14a1) to eliminate a gap between those yokes.

In this case, in each pair of the yoke pieces 14a2 and 14a3, 14a5 and 14a6, 14a10 and 14a11, 14a13 and 14a14, 14a18 and 14a19, and 14a21 and 14a22, the projection 14e2P is slid in the hole 14e1H so as to displace the yoke pieces in a direction away from each other.

Therefore, the gaps between the tooth 14b4, 14b12 or 14b20 formed with the yoke piece 14a4, 14a12 or 14a20 and the teeth adjacent thereto (14b3 and 14b5, 14b11 and 14b13 or 14b19 and 14b21) can be further widened.

Then, in the winding process the same as that of S12 in the first embodiment, the winding 14c is wound around the three teeth 14b4, 14b12 and 14b20 through the widened gaps.

In the subsequent loops, similarly to the first embodiment, the gap widening process and winding process is repeated to wind the winding 14c around teeth (e.g., 14b5, 14b13, 14b21) other than the teeth which have been already wound with the winding 14c.

Thus, since the second embodiment is configured to deform the yoke 14a to substantially triangular shape so that three pairs of (i.e., six) gaps formed between adjacent teeth are widened, in addition to the effects of the first embodiment, it becomes possible to simultaneously wind the windings 14c for the U-, V- and W-phases.

Next, a stator of the electric rotating machine according to a third embodiment will be explained.

Figure 10:
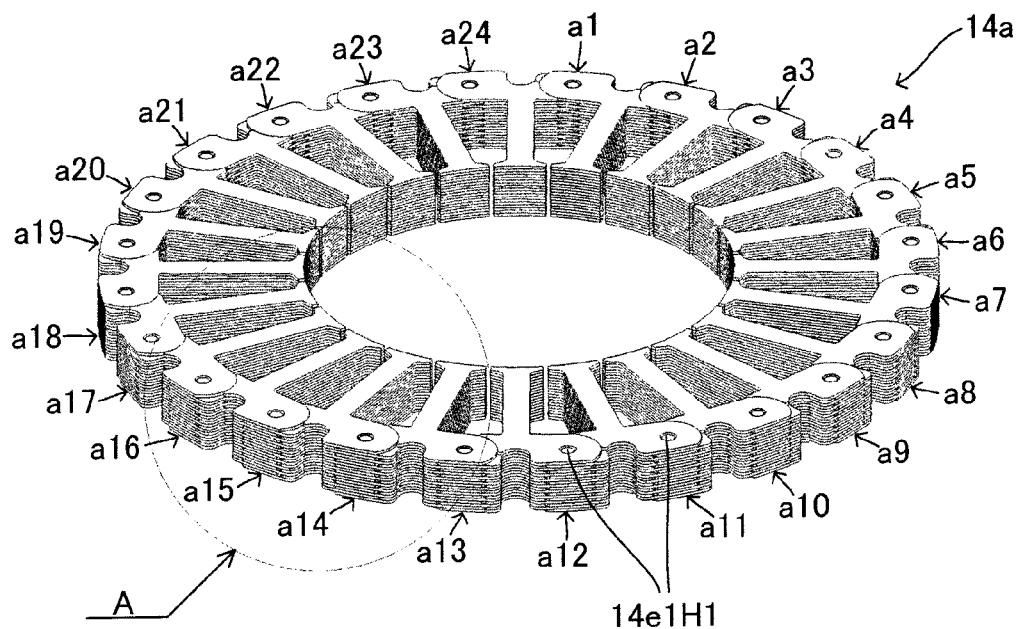
FIG. 10 is a perspective view, similar to FIG. 2, but showing a stator of an electric rotating machine according to a third embodiment of this invention.
Figure 11:
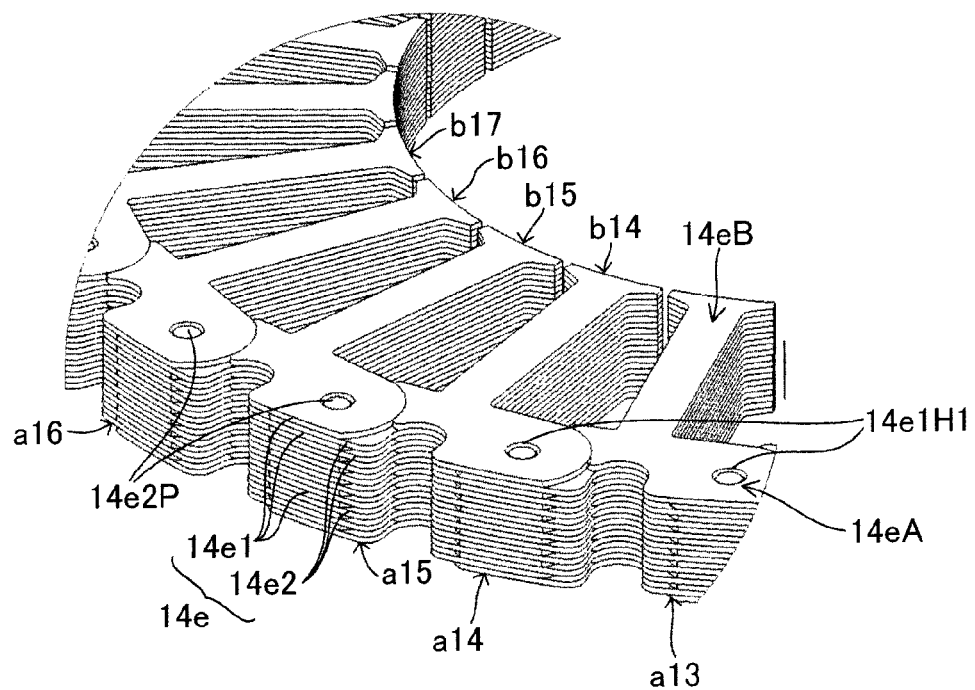
FIG. 11 is an enlarged view of region A of FIG. 10.

FIG. 10 is a perspective view, similar to FIG. 2, but showing a stator of an electric rotating machine according to a third embodiment of this invention, and FIG. 11 is an enlarged view of region A of FIG. 10. The same element as that in the first embodiment is assigned with the same reference numeral.

Explaining the third embodiment with focus on points of difference from the first and second embodiments, in the third embodiment, instead of the elliptical hole 14e1H, a round hole 14e1H1 is provided. Specifically, each of the yoke pieces 14an has the first plate e1 bored with the round hole 14e1H1 and the second plate e2 formed with the projection 14e2P and the plurality of the yoke pieces 14an are rotatably connected through the hole 14e1H1 and the projection 14e2P. Each of the yoke pieces has formed with a recess in the periphery and is made different in shape from that of the first and second embodiments. The rest of the configuration is the same as that of the first embodiment.

With this, by widening a gap(s) of tooth on which the winding 14c is to be wound and by inserting the winding 14c through the gap(s), it becomes possible to easily wind the winding 14c on the teeth 14bn.

In addition, each of the yoke pieces 14an has a first plate e1 bored with an elliptical hole 14e1H and a second plate e2 formed with a projection 14e2P and the plurality of the yoke pieces 14an are rotatably connected through the elliptical hole 14e1H and the projection 14e2P. With this, since no displacement arises in the yoke in the circumferential direction and the increase in length of the yoke 14a in that direction is zero, it becomes possible to prevent the jumper portion 14c1 from loosening more firmly even when the one winding 14c is wound around a plurality of teeth 14bn continuously.

Further, since the hole 14e1H and projection 14e2P are provided only to the outermost first plate 14e1 or outermost second plate 14e2, in other words, one of the first plate e1 and the second plate e2 is installed outermost in the laminated direction of each of the yoke pieces 14an, the decrease in magnetic paths in the yoke 14a can be suppressed to the minimum.

As stated above, the first to third embodiments are configured to have a stator (14) of an electric rotating machine, comprising: a plurality of laminated yoke pieces (14an) that form a yoke (14a) of circular shape when assembled, the yoke pieces being made rotatable relative to each other; a plurality of laminated teeth (14bn) each connected to each of the yoke pieces, and a winding (14c) to be wound on the teeth; wherein the teeth (14bn) radially protrude inward in the yoke (14a) when the yoke pieces (14an) are assembled as the yoke such that a gap between adjacent teeth can be widened than others (other gaps).

In the stator, each of the yoke pieces (14an) has a first plate (14e1) bored with a hole (14e1H, 14e1H1) and a second plate (14e2) formed with a projection (14e2P) and the plurality of the yoke pieces (14an) are rotatably connected through the holes and the projections.

In the stator, each of the yoke pieces (14an) has a first plate (14e1) bored with a non-round hole, e.g., an elliptical hole (14e1H) and a second plate (14e2) formed with a projection (14e2P) and the plurality of the yoke pieces (14an) are rotatably connected through the non-round hole (14e1H) and the projection (14e2P), and are displaceably connected by sliding the projection (14e2P) in the non-round hole (14e1H).

In the stator, one of the first plate (14e1) and the second plate (14e2) is installed outermost in a laminated direction of each of the yoke pieces (14an).

As stated above, the first to third embodiments are configured to have a method of winding of a stator (14) of an electric rotating machine having a yoke (14a) of circular shape and a plurality of teeth (14bn) that are formed to radially protrude inward in the yoke and wound with a winding (14c), comprising the steps of: gap widening process (S10) that deforms the yoke to noncircular shape to widen a gap between adjacent teeth compared to others; and winding process (S12) that insert the winding through the widened gap and wind the winding on the teeth.

In the method, the yoke (14a) is deformed to substantially triangular shape in the gap widening process.

It should be noted that, in the foregoing, although the yoke 14a is deformed to elliptical or substantially triangular shape, it may be another shape that can ensure a wide gap between a tooth to be wound with the winding 14c and teeth adjacent thereto.

It should be also noted that, although the elliptical hole is disclosed as an example of the non-round hole, the non-round hole can be any shape other than the ellipse if it can allow the yoke pieces to displace with each other.

In the stator, each of the yoke pieces (14an) has a first plate (14e1) bored with a non-round hole, e.g., an elliptical hole (14e1H) and a second plate (14e2)

Japanese Patent Application No. 2008-237882 filed on Sep. 17, 2008, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A stator of an electric rotating machine, comprising:
   a plurality of laminated yoke pieces that form a yoke of circular shape when assembled, the yoke pieces being made rotatable relative to each other;
   a plurality of laminated teeth each connected to each of the yoke pieces, and
   a winding to be wound on the teeth;
   wherein the teeth radially protrude inward in the yoke when the yoke pieces are assembled as the yoke, and
   wherein, when an external force is applied to the yoke pieces, a gap between some adjacent teeth is widened and the gap between other adjacent teeth is closed.

2. The stator according to claim 1, wherein each of the yoke pieces has a first plate bored with a hole and a second plate formed with a projection and the plurality of the yoke pieces are rotatably connected through the holes and the projections.

3. The stator according to claim 1, wherein each of the yoke pieces has a first plate bored with a non-round hole and a second plate formed with a projection and the plurality of the yoke pieces are rotatably connected through the non-round hole and the projection, and are displaceably connected by sliding the projection in the non-round hole.

4. The stator according to claim 2, wherein one of the first plate and the second plate is installed outermost in a laminated direction of each of the yoke pieces.

5. The stator according to claim 3, wherein one of the first plate and the second plate is installed outermost in a laminated direction of each of the yoke pieces.

* * * * *